United States Patent
Hara et al.

(10) Patent No.: US 6,577,632 B2
(45) Date of Patent: Jun. 10, 2003

(54) CELL TRANSMITTING SYSTEM FOR BIT-MULTIPLEXING LOW-SPEED DATA

(75) Inventors: Kiyofumi Hara, Kanagawa (JP); Masaaki Nagao, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/170,946

(22) Filed: Oct. 13, 1998

(65) Prior Publication Data

US 2003/0039251 A1 Feb. 27, 2003

(30) Foreign Application Priority Data

Oct. 28, 1997 (JP) .............................................. 9-296023

(51) Int. Cl.$^7$ .............................. H04J 3/24; H04L 12/56
(52) U.S. Cl. ..................... 370/395.1; 370/465; 370/535
(58) Field of Search ................................. 370/230, 235, 370/389, 392, 395.1, 231, 399, 465, 466, 467, 535

(56) References Cited

U.S. PATENT DOCUMENTS

| | | | | |
|---|---|---|---|---|
| 5,343,468 A | * | 8/1994 | Rau | 370/395 |
| 5,838,677 A | * | 11/1998 | Kozaki et al. | 370/389 |
| 5,886,980 A | * | 3/1999 | Zheng | 370/230 |
| 5,991,267 A | * | 11/1999 | Monzawa et al. | 370/230 |
| 6,084,889 A | * | 7/2000 | Murakami | 370/474 |
| 6,188,693 B1 | * | 2/2001 | Murakami | 370/395 |

* cited by examiner

Primary Examiner—Alpus H. Hsu
(74) Attorney, Agent, or Firm—Katten Muchin Zavis Rosenman

(57) ABSTRACT

A bit accommodation pattern table stores the information about bit accommodation patterns when data from a plurality of terminals are accommodated into predetermined multiplexing unit data in bits. A bit multiplexing/demultiplexing unit multiplexes the data from each of the plurality of terminals into the predetermined multiplexing unit data; demultiplexes the data addressed to each of the plurality of terminals, which is multiplexed into the predetermined multiplexing unit data; and transfers the demultiplexed data to each of the plurality of terminals. A cell conversion processing unit performs interconversion between the predetermined multiplexing unit data processed by the bit multiplexing/demultiplexing unit and cells corresponding to a predetermined link.

22 Claims, 17 Drawing Sheets

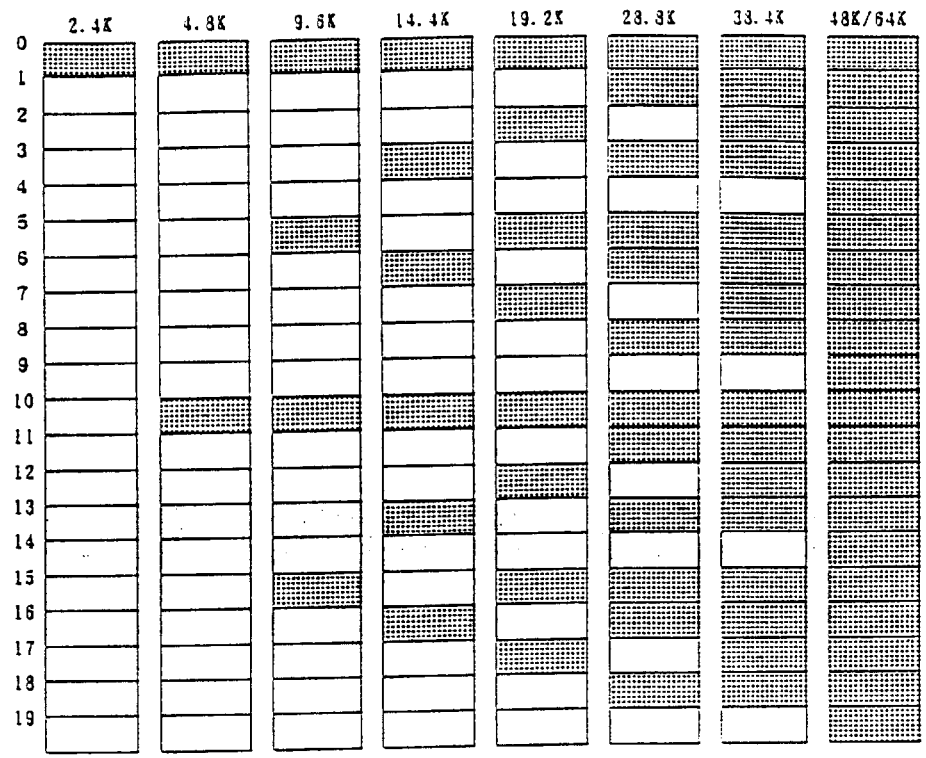
FIG. 6A
FIG. 6B
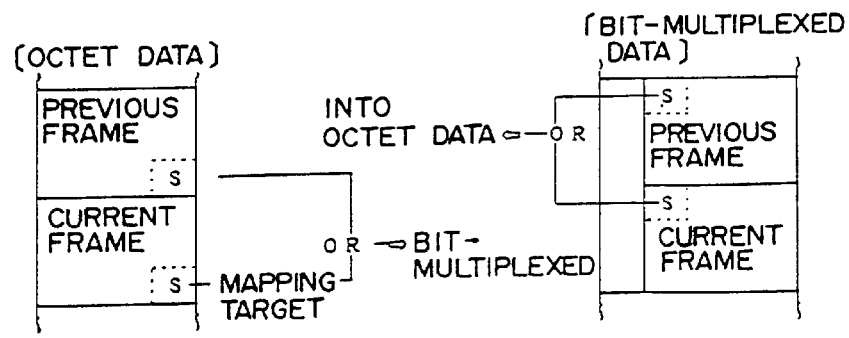
FIG. 6C

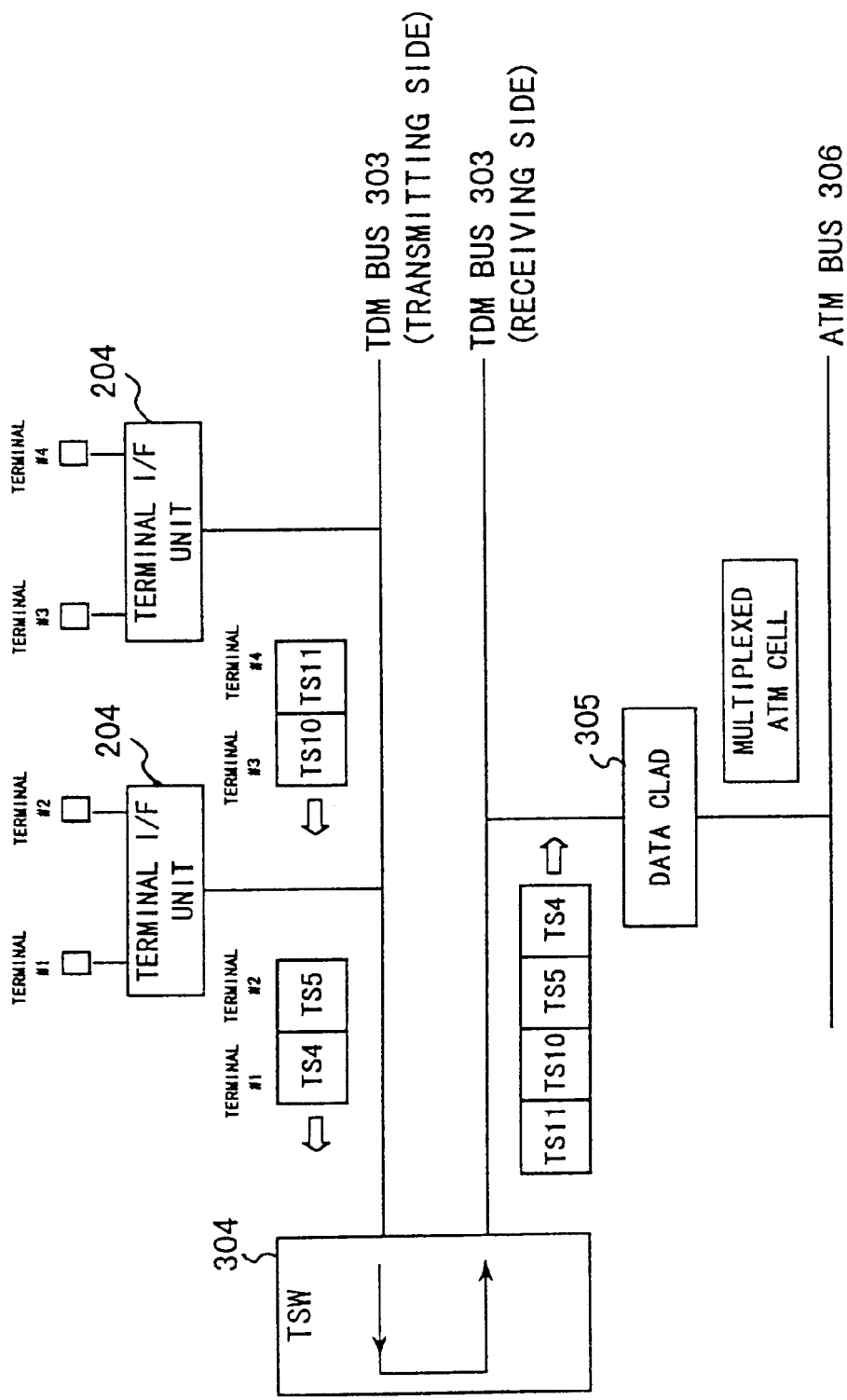
F I G. 7

| TERMINAL | TS | OFFSET |
|---|---|---|
| A | T1 | 1 . 1 |
| B | T1 | 3 . 10 |
| C | T1 | 5 . 19 |
| D | T1 | 7 . 4 |
| E | T2 | 0 . 9 |
| F | T2 | 1 . 14 |

FIG. 12

| TERMINAL | ROUTE | Internal VPI/VCI corresponding to data CLAD identifier (TS) | BYPASS ROUTE | | PRIORITY | NORMAL VPI/VCI | STATE (Normal or Abnormal) | SECONDARY VPI/VCI | QoS TYPE |
|---|---|---|---|---|---|---|---|---|---|
| A B | X Z | 03 | EXISTS | LINE I/F UNIT IDENTIFIER | HIGH | 101/51 | | 111/45 | CBR |
| C | X Z | 04 | EXISTS | LINE I/F UNIT IDENTIFIER | MEDIUM | 101/51 | | 111/45 | CBR |
| D | X Z | 05 | EXISTS | LINE I/F UNIT IDENTIFIER | LOW | 101/51 | | UNUSED | UBR |
| E | X Z | 06 | NONE | NONE | HIGH | 101/31 | | UNUSED | CBR |

CELL TRANSMITTING SYSTEM FOR BIT-MULTIPLEXING LOW-SPEED DATA

BACKGROUND OF THE INVENTION

1. Field of the Invention

The present invention relates to a technique for accommodating an existing low-speed data terminal, and multiplexing cells on a trunk line in a cell transmitting network such as an ATM network, etc., which makes a communication by logically multiplexing and exchanging fixed-length cells.

2. Description of the Related Art

With the popularization of an in-house LAN, the demand for a WAN (Wide Area Network) node device (simply referred to as a node hereinafter) for integrating and accommodating a conventional telephone set or low-speed data terminal and LAN traffic, and dynamically securing a relay bandwidth of the LAN traffic of a high burst nature, has been increasing in recent years.

As a technique for dynamically utilizing a relay bandwidth, an ATM (Asynchronous Transfer Mode) multiplexing technique for logically multiplexing fixed-length cell data, and transmitting each of the multiplexed data, has been reviewed mainly in a broadband field. Recently, this ATM multiplexing technique has been applied also to a narrowband field.

For such a case, a hybrid multiplexing technique for using an existing STM (Synchronous Transfer Mode) dedicated line which can use a multi-access service as a trunk line, and for transmitting ATM cells to be communicated between nodes by using one or a predetermined number of a plurality of time-division channels of the STM dedicated line, was developed. By adopting such a configuration, the ATM multiplexing technique which can flexibly cope with traffic fluctuations and is suitable for a highly efficient transmission can be merged with a TDM (Time Division Multiplexing) technique which can assure a line quality.

Due to the above described technical background, the demand for an ATM switching node which can terminate an ATM trunk line implemented by an ATM dedicated line, or the STM dedicated line which can use a multi-access service, is currently on the rise.

The most important issue to be solved is how to integrally and efficiently accommodate a conventional low-speed data terminal together with a telephone set or LAN traffic, and how to multiplex the LAN traffic on the ATM trunk line in order to maximize the integrated multiplexing effect.

At this time, it is not sufficient only to accommodate a low-speed data terminal efficiently. There is an essential need for providing a value-added service such as a service which makes one terminal continue its communication and makes another terminal abort its communication when a fault occurs on an ATM trunk line.

FIG. 1 is a schematic diagram showing the configuration of a conventional ATM transmitting system for accommodating low-speed data terminals.

Conventionally, when low-speed data from each of a plurality of terminals 103 is received by a terminal IF (interface) unit 104, a cell conversion processing unit 105 converts the low-speed data into ATM cells. In this case, the cell conversion processing unit 105 obtains the VPI/VCI corresponding to each of terminal ports, which is predefined in a terminal port ⇌VPI/VCI conversion table 107; stores the obtained VPI/VCI in the header of each of the ATM cells; and divides the low-speed data and stores the divided low-speed data in the payload of each of the ATM cells. Then, the ATM cells are transmitted from an ATM network transmitting/receiving unit 106 to an ATM trunk line within an ATM network 101.

As described above, with the conventional technique, a single connection path 109 such as a Soft-PVC (a PVC which can be bypassed by software control), a PVC (Permanent Virtual Circuit), or an SVC (Switched Virtual Circuit) which is not shown in this figure, is provided on the ATM trunk line for each opposing connection of each of the plurality of terminals 103.

Therefore, if terminals 103 such as low-speed terminals, whose transmission rates are low in respective communications and which can be accommodated even if their number is large, are accommodated, there is the problem that resources of path identifiers (or cell identifiers) such as VPI/VCI (Virtual Path Identifier/Virtual Channel Identifier) for identifying each of the above described connection paths become insufficient.

SUMMARY OF THE INVENTION

The present invention was developed in the above described background, and aims at providing a service which can efficiently accommodate a low-speed data terminal; effectively use path identifiers such as a VPI/a VCI, etc., which are limited resources; perform a relief process to be quickly performed using a bypass route line or a back-up line when a communication cannot be made due to an occurrence of a fault on an ATM trunk line, etc.; and minimize the number of times that a communication between end users is disconnected (released) or a time period during which a communication cannot be made.

The present invention assumes a cell transmitting device (ATM switching node 202) for accommodating a terminal and multiplexing cells on a trunk line in a cell transmitting network (ATM network 201) which logically multiplexes fixed-length cells (ATM cells) and makes a communication.

A bit accommodation pattern table (209) stores the information about bit accommodation patterns when data from a plurality of terminals (203) are accommodated into predetermined multiplexing unit data in bits.

A bit multiplexing/demultiplexing device (bit multiplexing/demultiplexing unit 205) multiplexes the data from each of the plurality of terminals into the predetermined multiplexing unit data by referencing the bit accommodation pattern table, demultiplexes data which is multiplexed into the predetermined multiplexing unit data and is addressed to each of the plurality of terminals, and transmits the demultiplexed data to each of the plurality of terminals.

A cell conversion processing device (cell conversion processing unit 207) performs conversion between predetermined multiplexing unit data processed by a bit multiplexing/demultiplexing device and cells corresponding to a predetermined link.

In the above described configuration of the present invention, the bit multiplexing/demultiplexing device may be adapted to multiplex/demultiplex data corresponding to a terminal belonging to a terminal group into/from the individual multiplexing unit data corresponding to the terminal group for each of a plurality of terminal groups; and a communication controlling device (ATM network transmitting/receiving unit 208, a path identifier conversion table 210, and an S-PVC converting unit 206), which performs different communication control for each of the plurality of terminal groups, may be further included. This communication controlling device performs bypass control of an individual trunk line, for example, for each terminal group when a communication fault occurs. Additionally, this communication controlling device performs bypass control of a trunk line, for example, based on an individual priority for each terminal group when a communication fault occurs.

Furthermore, this communication controlling device performs bypass control of a trunk line, for example, based on an individual service category for each terminal group when a communication fault occurs.

In the above described configuration according to the present invention, the cell conversion processing device may be configured to switch a predetermined link corresponding to the cells to be converted/restored into/from predetermined multiplexing unit data to a predefined secondary link, when a communication fault occurs.

Furthermore, the above described configuration of the present invention may further include a table rewriting controlling device (LS unit 313) for changing the connection of a terminal by rewriting the bit accommodation pattern table under a predetermined condition. This table rewrite controlling device rewrites the bit accommodation pattern table, for example, according to a time zone, a day of the week, a date, etc.

Still further, in the above described configuration of the present invention, a point-to-multipoint connection is made by setting the entry for specifying that the data input from a trunk line side is transmitted to the identical or a different trunk line side as it, is in the bit accommodation pattern table; or control is performed in such a way that the data corresponding to a predetermined terminal is bypassed to another terminal or another cell transmitting device, when a fault occurs in the predetermined terminal or on a line of the predetermined terminal.

As described above, according to the present invention, low-speed data from a plurality of terminals, etc. are multiplexed into predetermined multiplexing unit data; and a single predetermined link is established between opposing cell transmitting devices for the multiplexing unit data; and the cells storing the multiplexing unit data are transmitted over the predetermined link. Namely, according to the present invention, a single link can be allocated to the respective connections of a plurality of terminals. Therefore, a low-speed terminal can be efficiently accommodated, and path identifiers such as VPI/VCI, etc., which are limited resources, can be effectively used.

Additionally, according to the present invention, one or a predetermined number of links, whose number is smaller than the number of connections of a plurality of terminals, are allocated to the plurality of terminals, thereby performing customization such as bypass control, a priority operation, a quality assurance operation, etc. for each of the plurality of terminals.

Furthermore, according to the present invention, the worst situation where a communication is entirely disconnected can be prevented by switching to a secondary link or by establishing and connecting a link between a terminal and the opposing cell transmitting device based on call set-up, when a fault occurs on a trunk line.

Still further, according to the present invention, a bit accommodation pattern in a bit accommodation pattern table is rewritten by manual control or automatic control, thereby changing the accommodation configuration of a terminal according to a predetermined condition, for example, according to day, night, or a day of the week, etc.

Still further, according to the present invention, an entry for specifying that the low-data input from a trunk line side is transmitted to an identical or different trunk line side as it is in the bit accommodation pattern table, thereby implementing a point-to-multipoint connection. Or, if a fault occurs on a line of a certain terminal, the data corresponding to the terminal can be bypassed to another terminal or another cell transmitting device.

BRIEF DESCRIPTION OF THE DRAWINGS

One skilled in the art can easily understand additional features and objects of this invention from the description of the preferred embodiment and some of the attached drawings, wherein

FIGS. 6A, 6B, and 6C show the data formats of respective terminal data;

FIG. 7 is a schematic diagram explaining a TSW;

FIG. 12 shows the data format of a path identifier conversion table (No. 2);

DESCRIPTION OF THE PREFERRED EMBODIMENT

Figure 1:
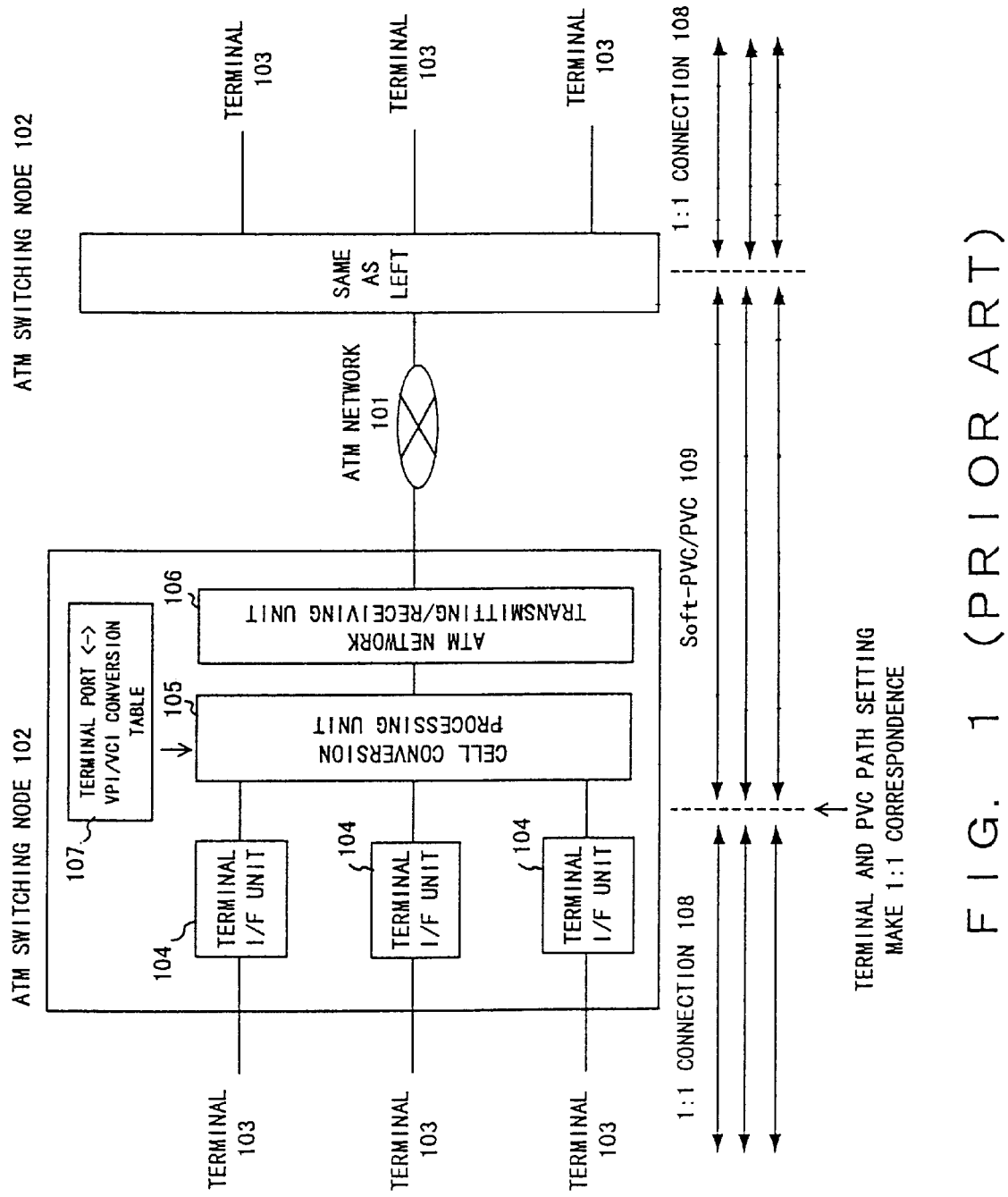
FIG. 1 is a block diagram showing a conventional technique.

Provided below is the explanation about the details of a preferred embodiment according to the present invention, by referring to the drawings.

Figure 2:
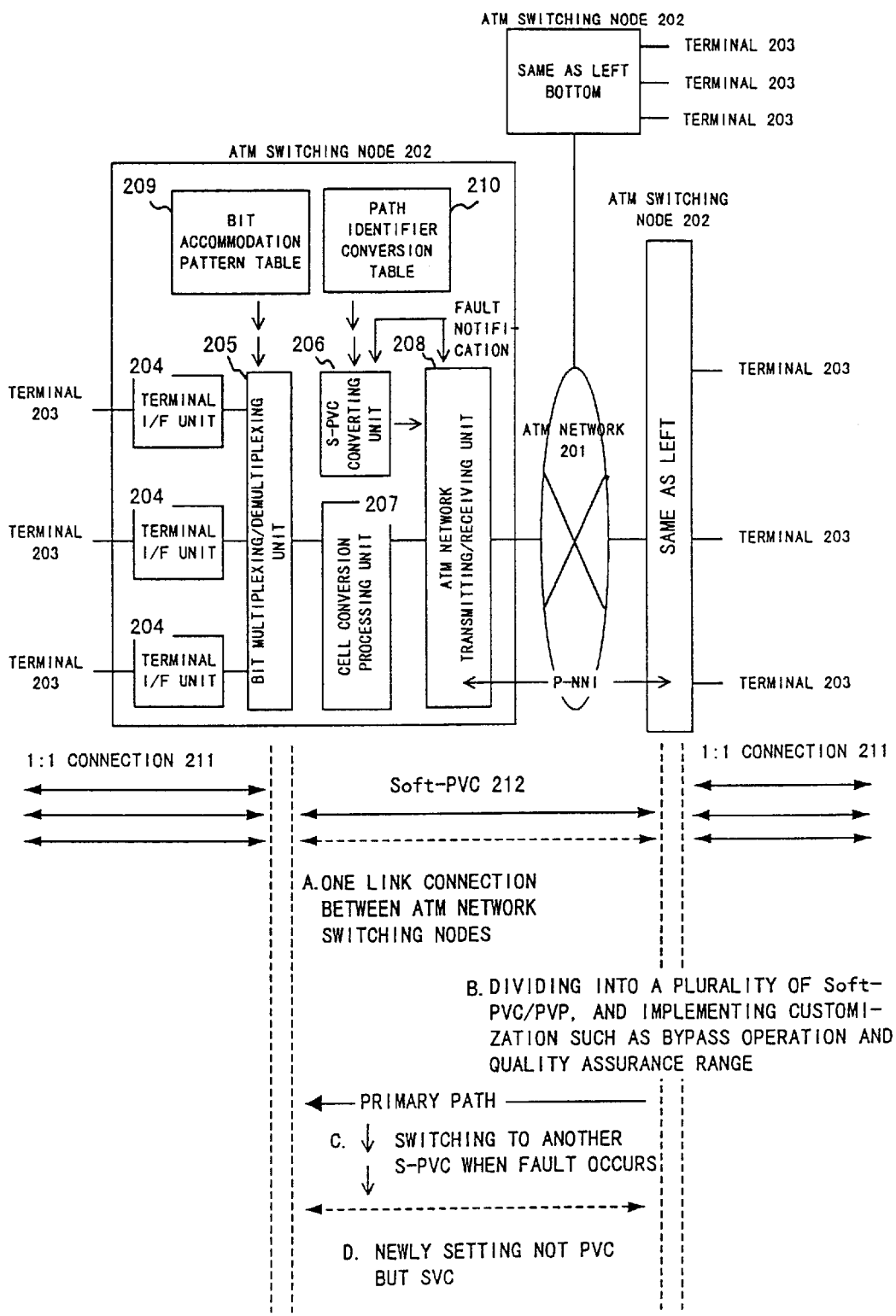
FIG. 2 is a block diagram showing the system configuration of a preferred embodiment according to the present invention.

Fundamental Configuration and Operations
According to the Preferred Embodiment of the
Present Invention FIG. 2 is a block diagram showing the configuration of an ATM transmitting system for accommodating low-speed data terminals according to a preferred embodiment of the present invention.

According to this preferred embodiment, after the low-speed data from a plurality of terminals 203 are received by respectively corresponding terminal IF (interface) units 204, a bit multiplexing/demultiplexing unit 205 multiplexes the data into predetermined multiplexing unit data (for example, one piece or a plurality of pieces of time slot data having the transmission rate of 64 Kbps (kilo bits per second)), which are passed to a cell conversion processing unit 207.

Conversely, the bit multiplexing/demultiplexing unit 205 demultiplexes low-speed data of each of the plurality of terminals 203 from the multiplexing unit data to be passed from a cell conversion processing unit 207, to be described later.

In this case, the information about the bit accommodation patterns when the low-speed data from each of the plurality of terminals 203 is accommodated into the multiplexing unit data in bits, is registered in a bit accommodation pattern table 209. The bit multiplexing/demultiplexing unit 205 controls the bit multiplexing/demultiplexing process by referencing the bit accommodation pattern table 209.

The cell conversion processing unit 207 assembles ATM cells from the multiplexing unit data passed from the bit multiplexing/demultiplexing unit 205. More specifically, the cell conversion processing unit 207 stores preset VPI/VCI for an internal path in a header of each of the ATM cells, divides the multiplexing unit data, and stores the divided data in a payload of each of the ATM cells.

Then, the ATM cells are transmitted to an ATM trunk line within an ATM network 201 by an ATM network transmitting/receiving unit 208. An S-PVC converting unit 206 obtains the VPI/VCI for an internal path and the VPI/VCI for an external path, which correspond to each multiplexing unit data, from a path identifier conversion table 210 while controlling the registered contents of the path identifier conversion table 210, and notifies the ATM network transmitting/receiving unit 208 of the obtained VPIs/VCIs. The ATM network transmitting/receiving unit 208 rewrites the VPI/VCI for an internal path, which are stored in the header of each of the ATM cells, to the VPI/VCI for an external path, which are notified from the S-PVC converting unit 206, and transmits the resultant ATM cells to the ATM trunk line within the ATM network 201.

Conversely, the ATM network transmitting/receiving unit 208 rewrites the VPI/VCI for an external path, which are stored in the header of the ATM cell received from the ATM trunk line within the ATM network 201, to the VPI/VCI for an internal path, which are notified from the S-PVC converting unit 206, and transfers the resultant ATM cells to the cell conversion processing unit 207.

In the above described cell transmitting/receiving process, the ATM network transmitting/receiving unit 208 terminates a P-NNI (Private-Network Network Interface) protocol which is a protocol on a private ATM trunk line within the ATM network 201.

The cell conversion processing unit 207 separates the multiplexing unit data from the ATM cell received from the ATM network transmitting/receiving unit 208, and passes the separated data to the bit multiplexing/demultiplexing unit 205.

As described above, according to the preferred embodiment of the present invention, the low-speed data from the plurality of terminals 203 are multiplexed into predetermined multiplexing unit data; one S(oft)-PVC 212 is established between opposing ATM switching nodes for the multiplexing unit data; and the ATM cells storing the multiplexing unit data are transmitted over the S-PVC 212, as shown in FIG. 2 part A. That is, according to the preferred embodiment of the present invention, one S-PVC 212 can be allocated for the respective one-to-one opposing connections 211 of the plurality of terminals 203, thereby efficiently accommodating low-speed data terminals, and effectively using path identifiers such as VPI/VCI, etc., which are limited resources.

Furthermore, according to the preferred embodiment of the present invention, one or more S-PVCs or PVPs whose number is fewer than the number of one-to-one opposing connections 211 for the plurality of terminals 203, are allocated for the connections as shown in FIG. 2 part B, thereby providing customized bypass control or a quality assurance range for each of the plurality of terminals 203 by utilizing a P-NNI or a QoS (Quality of Service) which is laid down as a standard of an ATM communication system.

Still further, according to the preferred embodiment of the present invention, the worst situation where a communication is entirely disconnected when a fault occurs on an ATM trunk line can be prevented not by using the P-NNI function, but by obtaining another (secondary) S-PVC/PVP and switching to that link as shown in FIG. 2 part C, or by establishing and connecting an SVC link between an opposing ATM switching node 202 and the plurality of terminals 203 as shown in FIG. 2 part D Still further, according to the present invention, a bit accommodation pattern in the bit accommodation pattern table 209 is rewritten by manual control or automatic control, thereby changing the accommodation configuration of the plurality of terminals 203 according to a condition such as day, night, or a day of the week, as shown in FIG. 2 part E.

Still further, according to the present invention, as shown in FIG. 2 part F, the entry for doubling back the low-speed data input from an ATM trunk line to the bit accommodation pattern table 209 is set in the bit accommodation pattern table 209, thereby implementing a point-to-multipoint connection or bypassing the data corresponding to a terminal 203 to another terminal 203 or another ATM switching node 202 when a fault occurs on the line of the terminal 203.

Figure 3:
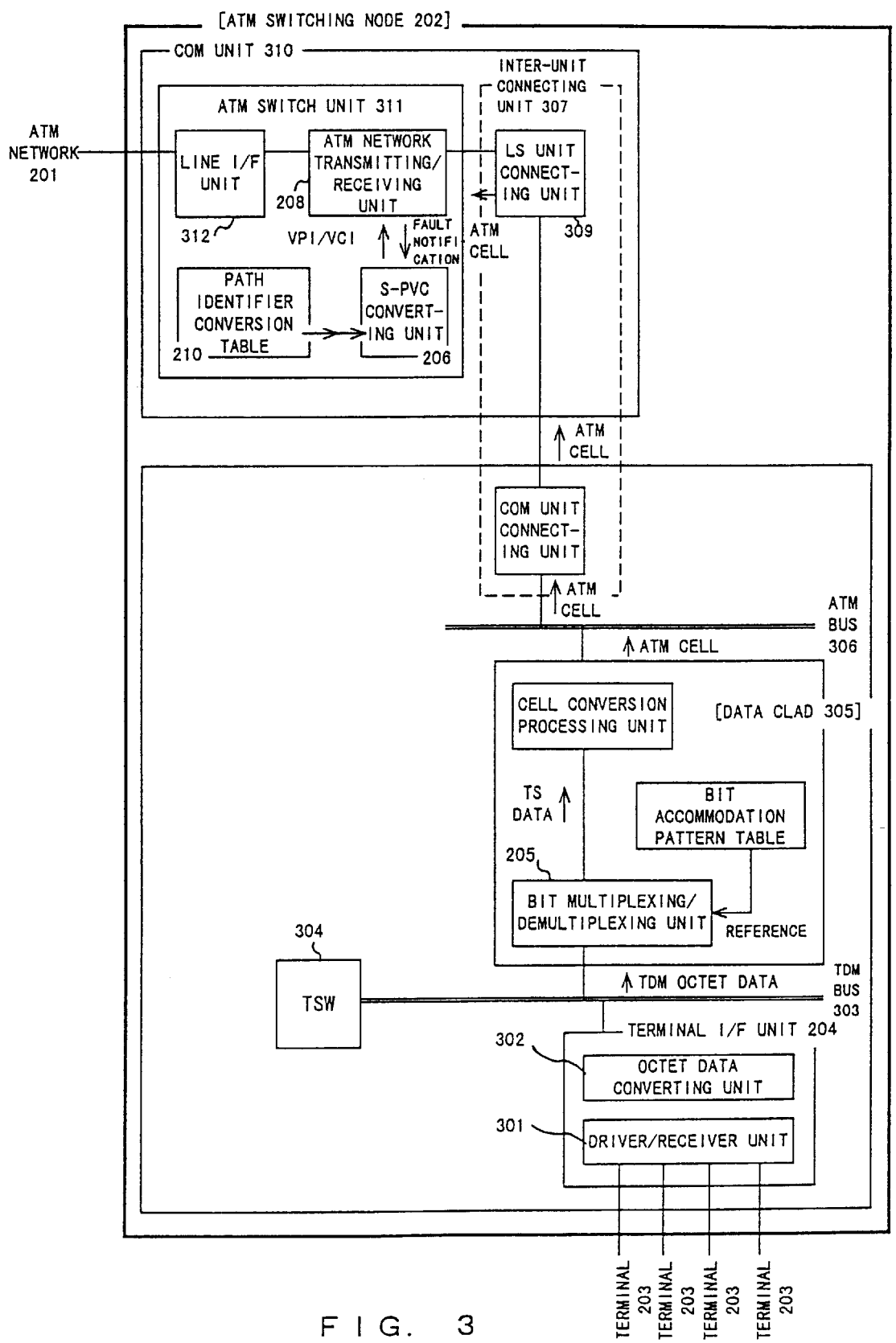
FIG. 3 is a block diagram showing the specific configuration of an ATM switching node in the preferred embodiment according to the present invention.

Specific Configuration and Operations According the Preferred Embodiment of the Present Invention FIG. 3 is a block diagram showing the specific configuration of the ATM switching node 202 in the system configuration shown in FIG. 2. The portions denoted by the same reference numerals as those of FIG. 2 have the same capabilities.

The ATM switching node 202 is roughly divided into two units such as a COM unit 310 and one or more LS units 313. These units are connected by an inter-unit connecting unit 307 composed of an LS unit connecting unit 309 (on a COM unit 310 side) and a COM unit connecting unit 308 (on an LS unit 313 side). In this portion, ATM cells are transmitted.

In the LS unit 313, a terminal IF unit 204 is composed of a driver/receiver unit 301 for accommodating the terminals 203 and transmitting/receiving a serial electric signal, and an octet data converting unit 302 for performing interconversion between the serial electric signal and octet data.

A data CLAD 305 is composed of the bit multiplexing/demultiplexing unit 205, the bit accommodation pattern table 209, and the cell conversion processing unit 207.

A TDM (Time Division Multiplexing) bus 303 is intended to make a TDM octet data communication between the terminal IF unit 204, the data CLAD 305, and each package of a TSW 302, to be described next, etc.

The TSW 304 performs a process for switching a time slot of the TDM octet data on the TDM bus 303.

The cell conversion processing unit 207 in the data CLAD 305 is connected to the ATM bus 306, and is intended to make an ATM cell communication with the COM unit 310 via the ATM bus and the COM unit connecting unit 308 in the inter-unit connecting unit 307.

In the COM unit 310, an ATM switch unit 311 performs a switching process for ATM cells to be transmitted between the ATM network 201 and the LS unit connecting unit 309. The ATM switch unit 311 is composed of a line interface (IF) unit 312 for accommodating an ATM trunk line in the ATM network 201, the ATM network transmitting/receiving unit 208, the S-PVC converting unit 206, and the path identifier conversion table 210, which are shown in FIG. 2.

The details of the operations of the ATM switching node 202 having the above described configuration will be described below.

Figure 4:
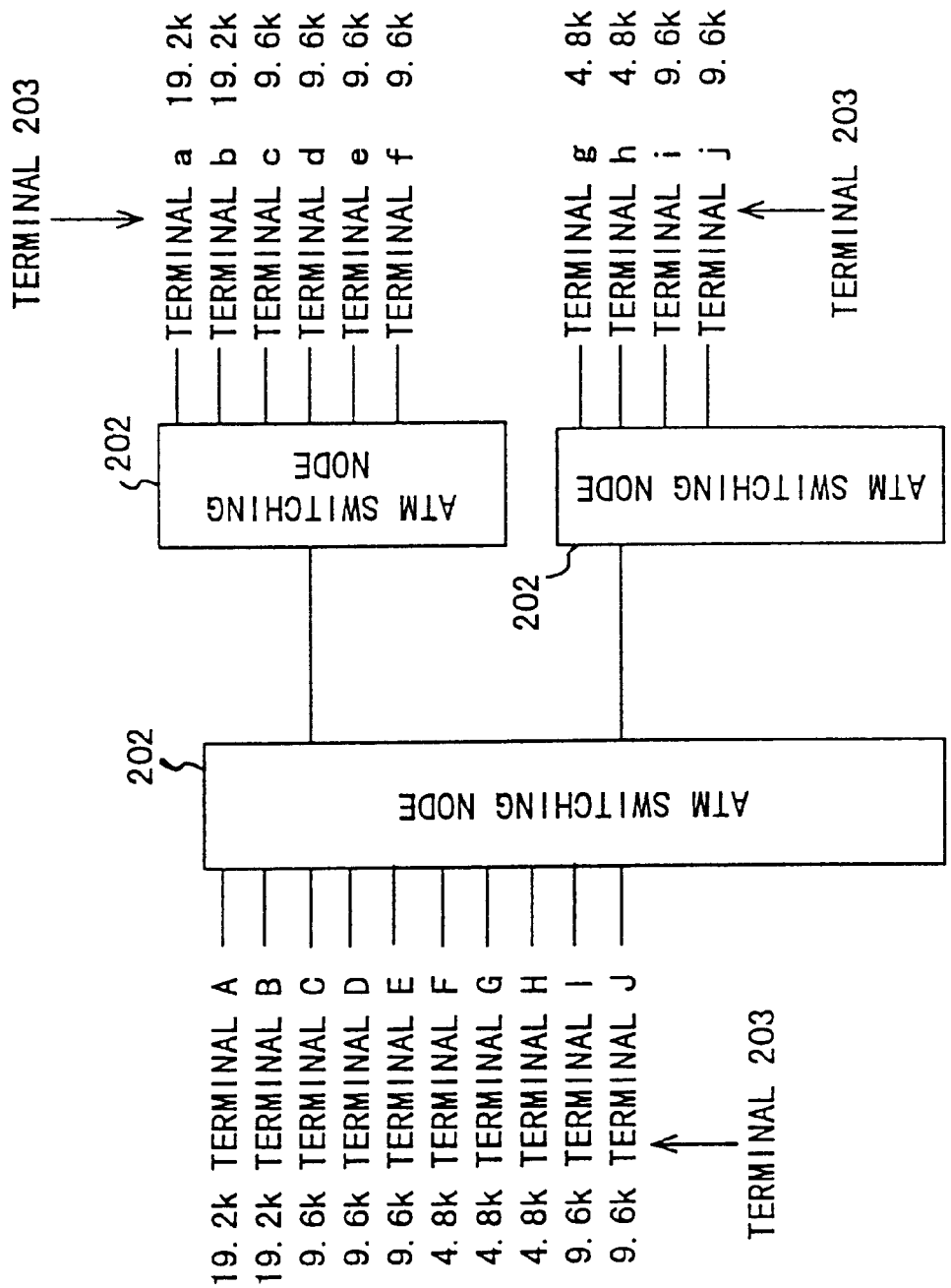
FIG. 4 exemplifies the structure of an ATM network 201 (No. 1)
Figure 5:
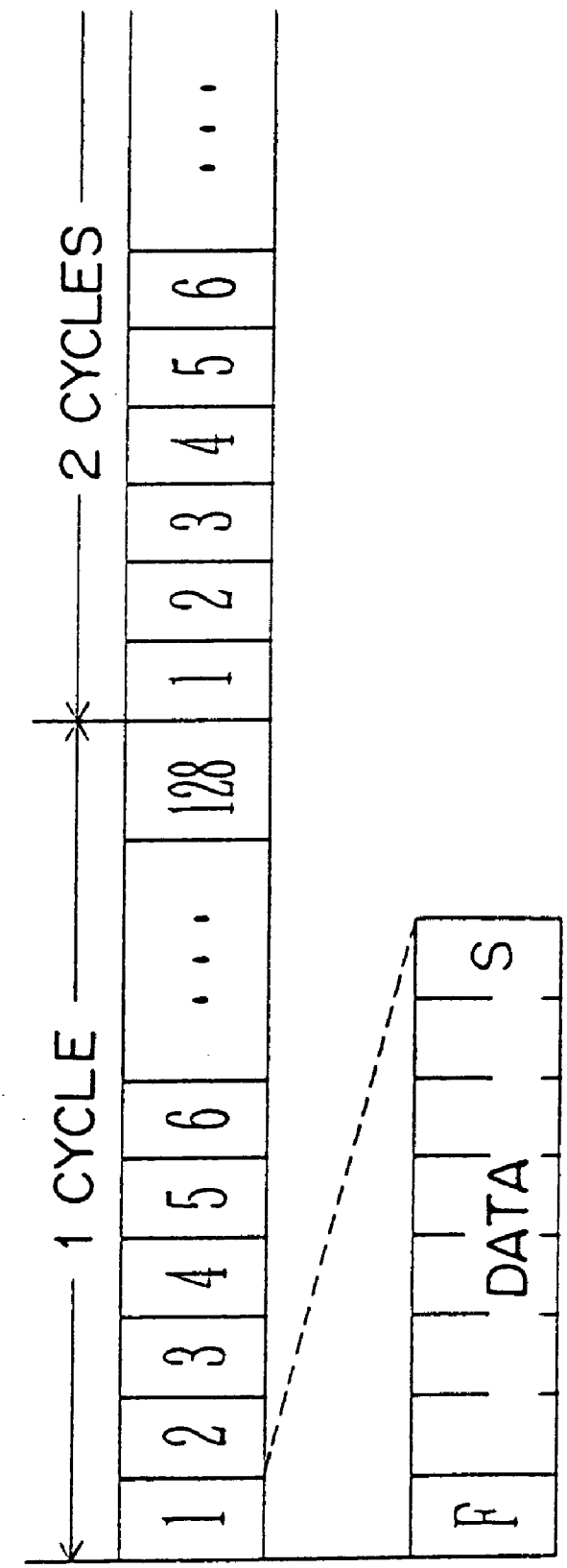
FIG. 5 shows the data format of TDM octet data.

Here, assume that the terminals 203 in the system configuration shown in FIG. 2 are arranged as shown in FIG. 4.

In this figure, "4.8 K", "9.6 K", and "19.2 K" respectively indicate the data communication rates (kilo bits per second) of the respective terminals 203.

Also assume that terminals "A" and "a", "B" and "C" and "c", "D" and "d", "E" and "e", "F" and "f", "G" and "g", "H" and "h", "I" and "i", and "J" and "j", all of which are the terminals 203, communicate with each other in this figure.

The data from each of the terminals 203 is received by the driver/receiver unit 301 in the terminal IF unit 204 of the LS unit 313, converted into TDM octet data by the octet data converting unit 302, and transmitted to the TDM bus 303.

On the TDM bus 303, the TDM octet data is structured in such a way that, for example, 128 time slots, each of which has a transmission rate of 64 Kbps, are channel-multiplexed. Each time slot is composed of 8 bits including a synchronous bit "F" of 1 bit and communication data of 7 bits. A single cycle composed of 128 channels is:

1 sec/(64000 bits/8)=125 $\mu$sec (microseconds)

In the preferred embodiment of the present invention, the data composed of 20 cycles of the above described TDM octet data, that is, the data in "125 $\mu$sec×20 cycles=2.5 msec (milliseconds)" will become a multiplexing unit.

When the TDM octet data is output from the octet data converting unit 302 to the TDM bus 303, the data format of the TDM octet data is, for example, the one shown in FIG. 6A or 6B.

Namely, according to the preferred embodiment of the present invention, terminal data are sampled and located so that each terminal data in 2.5 msec at each of the terminal rates is arranged as regularly as possible on a time axis (in a cycle direction) within the multiplexing unit composed of 20 cycles, as shown in FIG. 6A.

FIG. 6B shows the details of the location of the terminal data whose transmission rates are 9.6 Kbps and 19.2 Kbps.

For the data whose transmission rate is 9.6 Kbps, "9600 bits/(1 sec/2.5 msec)=24 bits" are transmitted in 2.5 msec.

This 24-bit data is located in the multiplexing unit composed of 20 cycles as shown in the left side of FIG. 6B.

In this case an alarm bit "A" is assigned as the first bit (0th bit) of the 0th octet of the multiplexing unit; a frame synchronous bit "F" is assigned as the first bit of each of the 5th, 10th, and 15th octets; and a signal line state bit "S" is assigned as the last bit (7th bit) of each of the 0th, 5th, 10th, and 15th octets.

The above described terminal data composed of 24 bits is located at the positions of 24 bits composed of the 1st to 6th bits of the 0th, 5th, 10th, and 15th octets. The remaining empty bits in the multiplexing unit will become unused bits.

For the data whose transmission rate is 19.2 Kbps, "19200 bits/(1 sec/2.5 msec) =48 bits" are transmitted in 2.5 msec corresponding to the multiplexing unit.

This 48-bit data is located in the multiplexing unit composed of 20 cycles as shown in the right side of FIG. 6B.

In this case, the alarm bit "A" is assigned as the 1st bit of the 0th octet of the multiplexing unit; the frame synchronous bit "F" is assigned as the 1st bit of each of the 2nd, 5th, 7th, 10th, 12th, 15th, and 17th octets; and the signal line state bit "S" is assigned as the last bit of each of the 0th, 2nd, 5th, 7th, 10th, 12th, 15, and the 17th octets.

The 48-bit terminal data is located at the positions of 48 bits composed of the 1st to 6th bits of the 0th, 2nd, 5th, 7th, 10th, 12th, 15th, and 17th octets. The remaining empty bits in the multiplexing unit will become unused bits.

Here, the alarm bit is a bit for notifying an abnormal state of a channel (time slot). If the channel is in a normal state, its value is set to "0". If the channel is in an abnormal state, its value is set to "1". The value of the signal line state bit "S" is set to "1" if a CD (Carrier Detect) signal is set to ON on the channel, while the value is set to "0" if the CD signal is set to OFF. The frame synchronous bit "S" is a bit used for establishing a frame synchronization conforming to the X. 50 protocol.

As is known from the data formats shown in FIGS. 6A and 6B, a considerable number of bits become empty when they are transmitted over the TDM bus 303. Therefore, the transmission efficiency of low-speed data is not so high.

FIG. 6C will be described later.

FIG. 7 is a schematic diagram explaining the TSW 304 connected to the TDM bus 303.

As shown in this figure, the TSW 304 performs a process for switching time slots between the TDM octet data on the TDM bus 303 on a transmitting side, to which each terminal IF unit 204 is connected (only one unit is shown in FIG. 3) and the TDM octet data on the TDM bus 303 on a receiving side, to which the data CLAD 305 is connected. With this switching process, the TDM octet data to be bit-multiplexed/demultiplexed is selected in the bit multiplexing/demultiplexing unit 205 in the data CLAD 305.

FIGS. 8A, 8B, 9A, and 9B are schematic diagrams explaining the bit multiplexing/demultiplexing process performed by the bit multiplexing/demultiplexing unit 205 in the data CLAD 305.

Figures 8A, 8B:
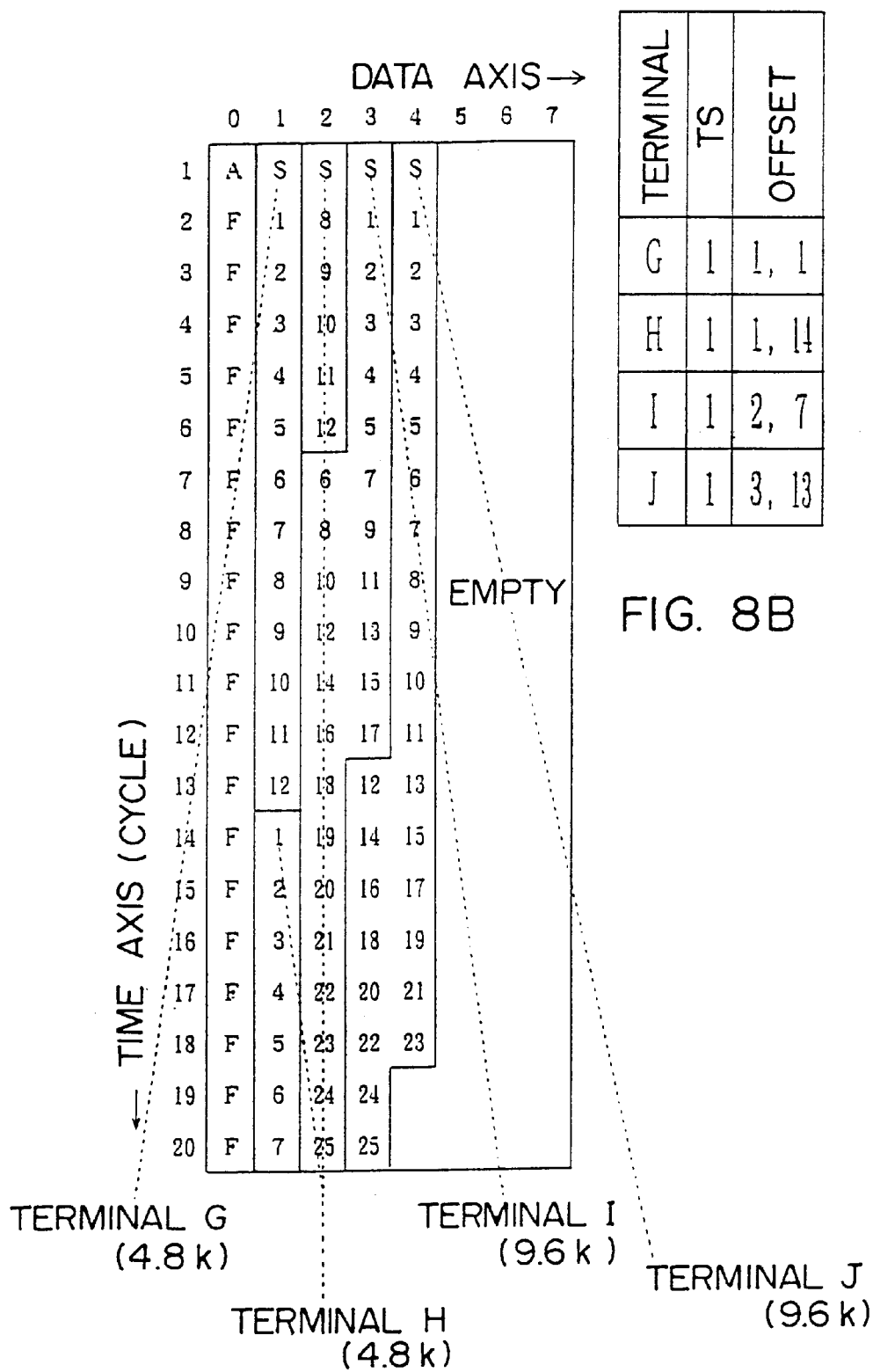
FIGS. 8A and 8B are schematic diagrams explaining bit accommodation patterns whose multiplexing unit is "1 time slot×20 cycles"
Figures 9A, 9B:
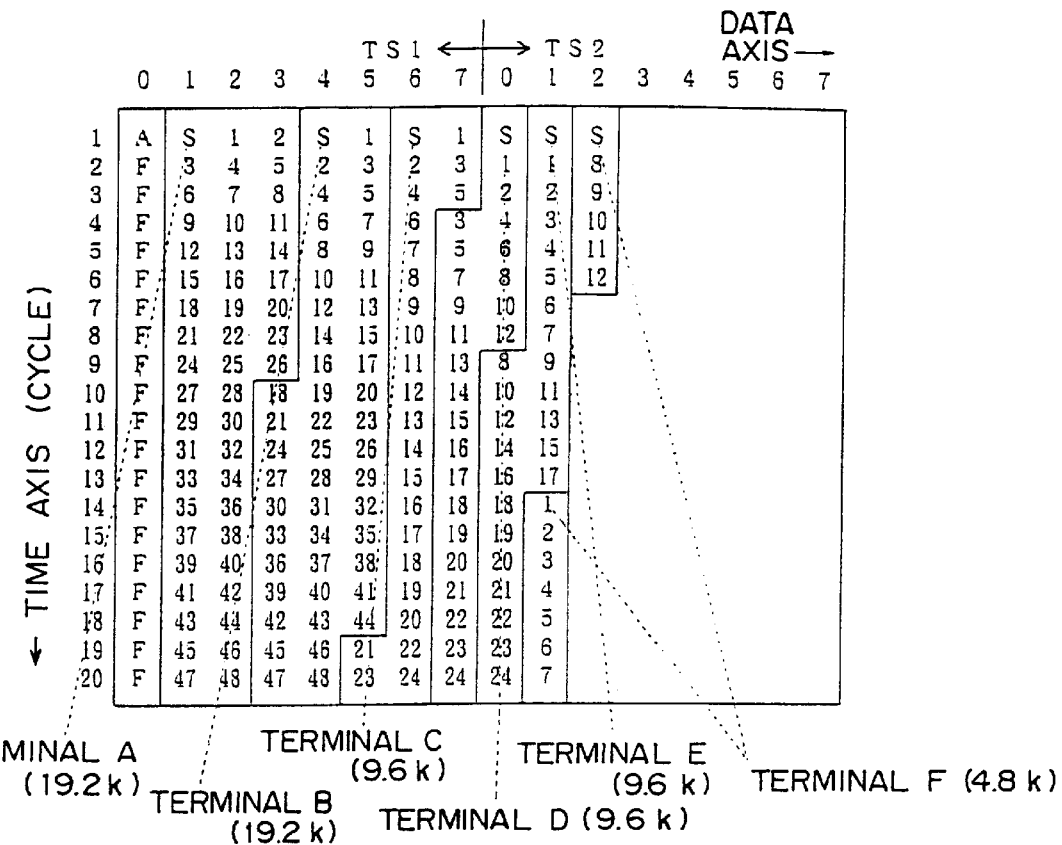
FIGS. 9A and 9B are schematic diagrams explaining bit accommodation patterns whose multiplexing unit is "2 time slots×20 cycles"

FIGS. 8A and 8B are schematic diagrams showing the bit accommodation patterns whose multiplexing unit is "1 time slot×20 cycles" and the registered contents of the bit accommodation pattern table 209 corresponding to the patterns. FIGS. 9A and 9B are schematic diagrams showing the bit accommodation patterns whose multiplexing unit is "2 time slots×20 cycles" and the registered contents of the bit accommodation pattern table 209 corresponding to the patterns.

The bit multiplexing/demultiplexing unit 205 determines the number of required bits of the bit data (including the A, F, and S bits) to be accommodated within 20 cycles according to the type and the number of terminals 203 to be bit-multiplexed/demultiplexed. If the number of required bits is up to 160, the bit data can be multiplexed into the multiplexing unit data composed of "1 time slot×20 cycles (8 bits×20 cycles =160 bits)". If the number of required bits is up to 320, the multiplexing unit data composed of "2 time slots×20 cycles (16 bits×20 cycles=320 bits)" becomes necessary. Namely, if "N={the value obtained by rounding up (the number of required bits 160 bits)}, the bit multiplexing/demultiplexing unit 205 performs the bit multiplexing/demultiplexing process whose multiplexing unit is "N time slots×20 cycles".

As a first example, the bit multiplexing/demultiplexing process whose multiplexing unit is "1 time slot×20 cycles" is explained by referring to FIGS. 8A and 8B.

As shown in FIG. 8A, the alarm bit "A" is stored by the first bit (0th bit) of the first cycle in a time axis direction, while the frame synchronous bit "F" is stored by the first bit of each of the 2nd to 20th cycles.

Then, an unaccommodated bit is searched in the search order from the 1st bit of the 1st to 20th cycles, the 2nd bit next to the 1st bit of the 1st to 20th cycles, the 3rd bit next to the 2nd bit of the 1st to 20 cycles, . . . within the multiplexing unit composed of "1 time slot×20 cycles". If the unaccommodated bit is found, unaccommodated bits are secured starting from the found bit by the number of required bits=12 bits+1 bit (S bit) in the above described search order for the terminal G. In this unaccommodated bit group, the signal line state bit "S" and then each data of 12 bits input from the terminal G are located by giving precedence to an unaccommodated bit position in the first cycle and to an unaccommodated bit position whose number is smaller in the same cycle.

Here, how to locate the S bit is explained by referring to FIG. 6C.

Before bits are multiplexed, a plurality of S bits are located within the 1 multiplexing unit composed of 20 cycles as shown in FIG. 6B. After the bits are multiplexed, only one S bit is located at the first bit of each bit multiplexing area.

When the bits are multiplexed, the S bit which is the last bit in each multiplexing unit (for example, the 7th bit of the 15th octet in the left side of FIG. 6B) before the bit multiplexing becomes a mapping target. However, to protect the S bit whose last bit only is OFF (the value "0"), the last bit "S" of the current frame and that of the preceding frame are ORed as shown in the left side of FIG. 6C. Its result is defined to be the S bit after the bits are multiplexed. The position of the S bit is obtained from an SACT bit of an ATM cell.

Conversely, when bits are demultiplexed, to protect the S bit which becomes OFF due to a bit error on an ATM trunk line, the first S bit of the current frame and that of the preceding frame are ORed as shown in the right side of FIG. 6C. Its result is copied to the last bit of each of the octets after the bits are demultiplexed.

Thereafter, respective bit data are located for the terminals H, I, and J.

As described above, the respective bit data are accommodated so that the bit data of the plurality of terminals 203 are arranged as regularly as possible within the multiplexing unit data according to the transmission rates of the respective terminals 203.

For such bit data accommodation, the bit accommodation pattern information including the contents shown in FIG. 8B are set in the bit accommodation pattern table 209 in the data CLAD 305 shown in FIG. 3. Namely, the time slot number (all of time slots are "TS1" in the example shown in FIG. 8A) to which the bit position accommodating the first signal line state bit "S" of the bit data corresponding to each of the terminals 203 belongs, and the offset position=(bit position, cycle position), which accommodates the first bit (signal line state bit S), are registered to this table for each entry corresponding to each of the terminals 203.

The bit multiplexing/demultiplexing unit 205 can perform the bit multiplexing/demultiplexing process based on the contents registered to the bit accommodation pattern table 209 and the above described bit accommodation rules.

FIGS. 9A and 9B show the second example of the bit multiplexing/demultiplexing process where "2 time slots×20 cycles" is used as a multiplexing unit.

The bit accommodation rules in this case are almost the same as those for the case shown in FIGS. 8A and 8B. However, in the example shown in FIG. 9A, the bits of each of the terminals 203 are accommodated in both the time slots TS1 and TS2, and the bit accommodation pattern table 209 stores time slot numbers to be registered such as TS1 and TS2 depending on the terminals 203 as shown in FIG. 9B.

Also the bit multiplexing/demultiplexing process whose multiplexing unit is "N time slots×20 cycles" can be implemented according to bit accommodation rules similar to those for the case shown in FIGS. 9A and 9B.

Figure 10:
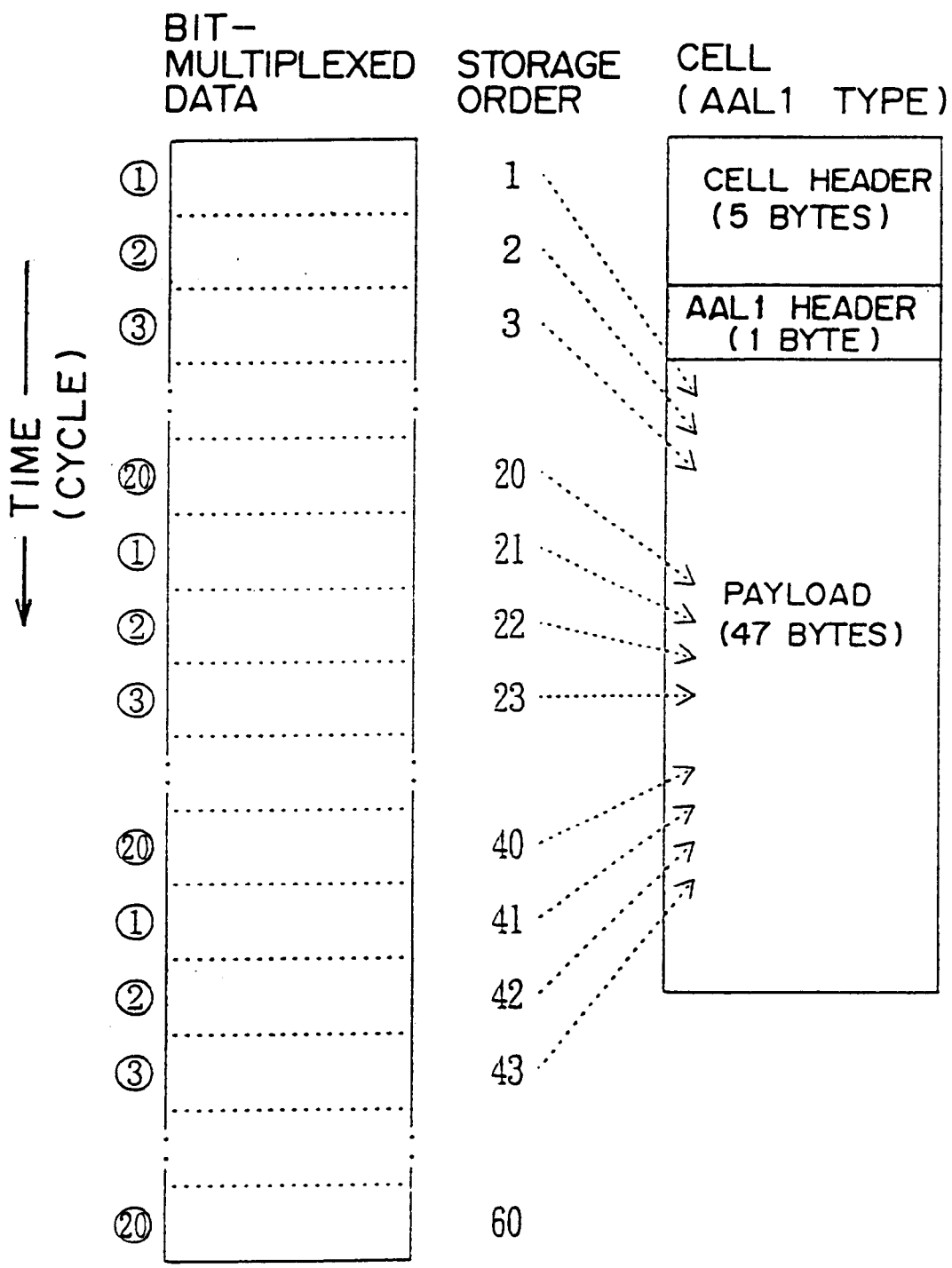
FIG. 10 is a schematic diagram explaining how to put bit-multiplexed data whose multiplexing unit is "1 time slot×20 cycles" into cells.
Figure 11:
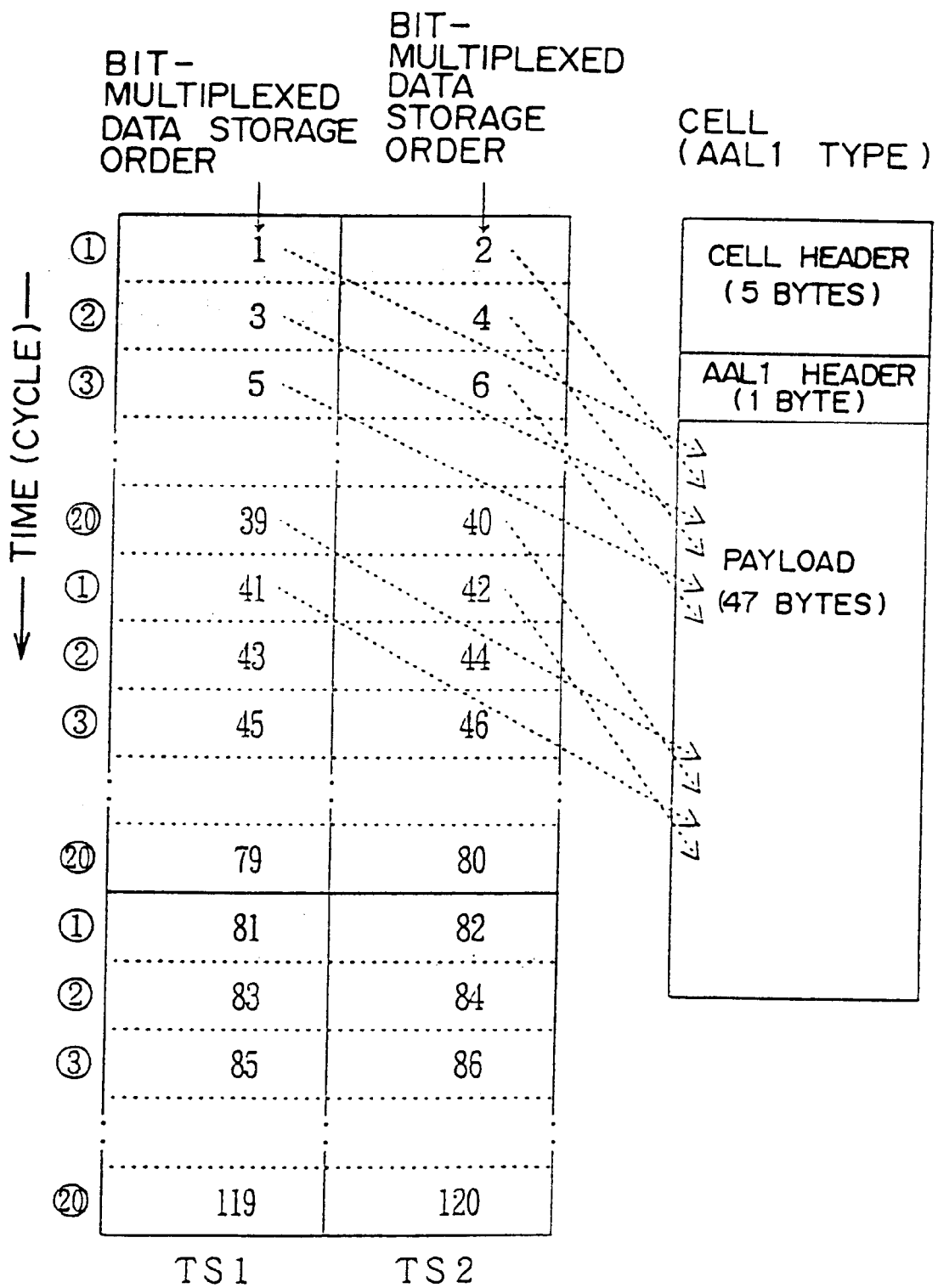
FIG. 11 is a schematic diagram explaining how to put bit-multiplexed data whose multiplexing unit is "2 time slots×20 cycles" into cells.

FIGS. 10 and 11 are schematic diagrams explaining the processes for putting data into cells, which are performed by the cell conversion processing unit 207 in the data CLAD 305.

According to the preferred embodiment of the present invention, a payload of an ATM cell stores bit-multiplexed data as a protocol data unit of an AAL 1 (ATM Adaptation Layer 1). In the payload of the ATM cell composed of 48 bytes, the first 1-byte area is an AAL 1 header, while the remaining 47-byte area stores the bit-multiplexed data.

FIG. 10 is a schematic diagram explaining the process for putting bit-multiplexed data whose multiplexing unit is "1 time slot×20 cycles" into cells, which is explained by referring to FIGS. 8A and 8B.

In the payload of the above described ATM cell, which is composed of 47 bytes, the bit-multiplexed data in one time slot is stored in octet units in a cyclic order starting from the 1st cycle to the 20th cycle.

Data of more than 47 bytes is stored in the payload of the ATM cell to be transmitted next.

If one multiplexing unit data is divided and stored in a plurality of ATM cells, a 1-byte-length pointer is inserted into every 8 bytes in order to determine the boundary between time slots.

FIG. 11 is a schematic diagram explaining the process for putting the bit-multiplexed data whose multiplexing unit is "2 time slots×20 cycles" into cells, which is explained by referring to FIGS. 9A and 9B.

In the above described payload of the ATM cell, which is composed of 47 bytes, the bit-multiplexed data in two time slots is stored in a cyclic order starting from the TS1 of the first cycle, TS2 of the first cycle, . . . , to the TS2 of the 20th cycle.

Similar to the case shown in FIG. 10, data of more than 47 bytes is stored in the payload of the ATM cell to be transmitted next, and a 1-byte-length pointer is inserted into every 8 bytes.

Also the process for putting bit-multiplexed data whose multiplexing unit is "N time slots×20 cycles" into cells can be implemented according to rules similar to those for the case of FIG. 11.

The process for restoring ATM cells to bit-multiplexed data is performed according to rules the reverse of those described above.

The cell conversion processing unit 207 further stores VPI/VCI for an internal path, which are provided from the S-PVC converting unit 206 via the ATM network transmitting/receiving unit 208 and will be described next, in the header of the ATM cell.

The above described ATM cell is transferred between the cell conversion processing unit 207 in the LS unit 313 and the ATM network transmitting/receiving unit 208 in the COM unit 310 via the ATM bus 306, the COM unit connecting unit 308, and the LS unit connecting unit 309.

Upon receiving an ATM cell from the data CLAD 305 in the LS unit 313, the ATM network transmitting/receiving unit 208 in the COM unit 310 transmits the ATM cell to the ATM trunk line in the ATM network 201 via the line interface unit 312. As described above, the S-PVC converting unit 206 obtains the VPI/VCI for an internal path, which correspond to each multiplexing unit data, and the VPI/VCI for the S-PVC 212 (refer to FIG. 2) which is an external path, from the path identifier conversion table 210 while controlling the registered contents of that table having the data format which is shown in FIG. 12 and will be described later; and notifies the ATM network transmitting/receiving unit 208 of the respective VPIs/VCIs. The ATM network transmitting/receiving unit 208 rewrites the VPI/VCI for an internal path, which are stored in the header of each ATM cell, to the VPI/VCI for the S-PVC 212 notified from the S-PVC converting unit 206; and transmits the resultant ATM cell to the ATM trunk line in the ATM network 201.

Conversely, the ATM network transmitting/receiving unit 208 rewrites the VPI/VCI for an external path, which are stored in the header of the ATM cell received from the ATM trunk line in the ATM network 201 via the line interface unit 312, to the VPI/VCI for an internal path, which are notified from the S-PVC converting unit 206; and transfers the resultant ATM cell to the cell conversion processing unit 207 in the LS unit 313 via the LS unit connecting unit 309, and the COM unit connecting unit 308 and the ATM bus 306 in the LS unit 313.

As described above, as shown in FIG. 2 part A, the low-speed data from the plurality of terminals 203 are multiplexed into the multiplexing unit data whose multiplexing unit is "N time slots×20 cycles (N≧1)", and a single S-PVC 212 is established between the plurality of terminals 203 and their opposing ATM switching node 202 for that multiplexing unit data. As a result, the ATM cells storing the multiplexing unit data are transmitted over the S-PVC 212.

FIG. 12 shows the data format of the path identifier conversion table 210. Use of this path identifier conversion table 210 allows a bypass operation, a priority operation, and a quality control operation, which will be described next.

Figure 13:
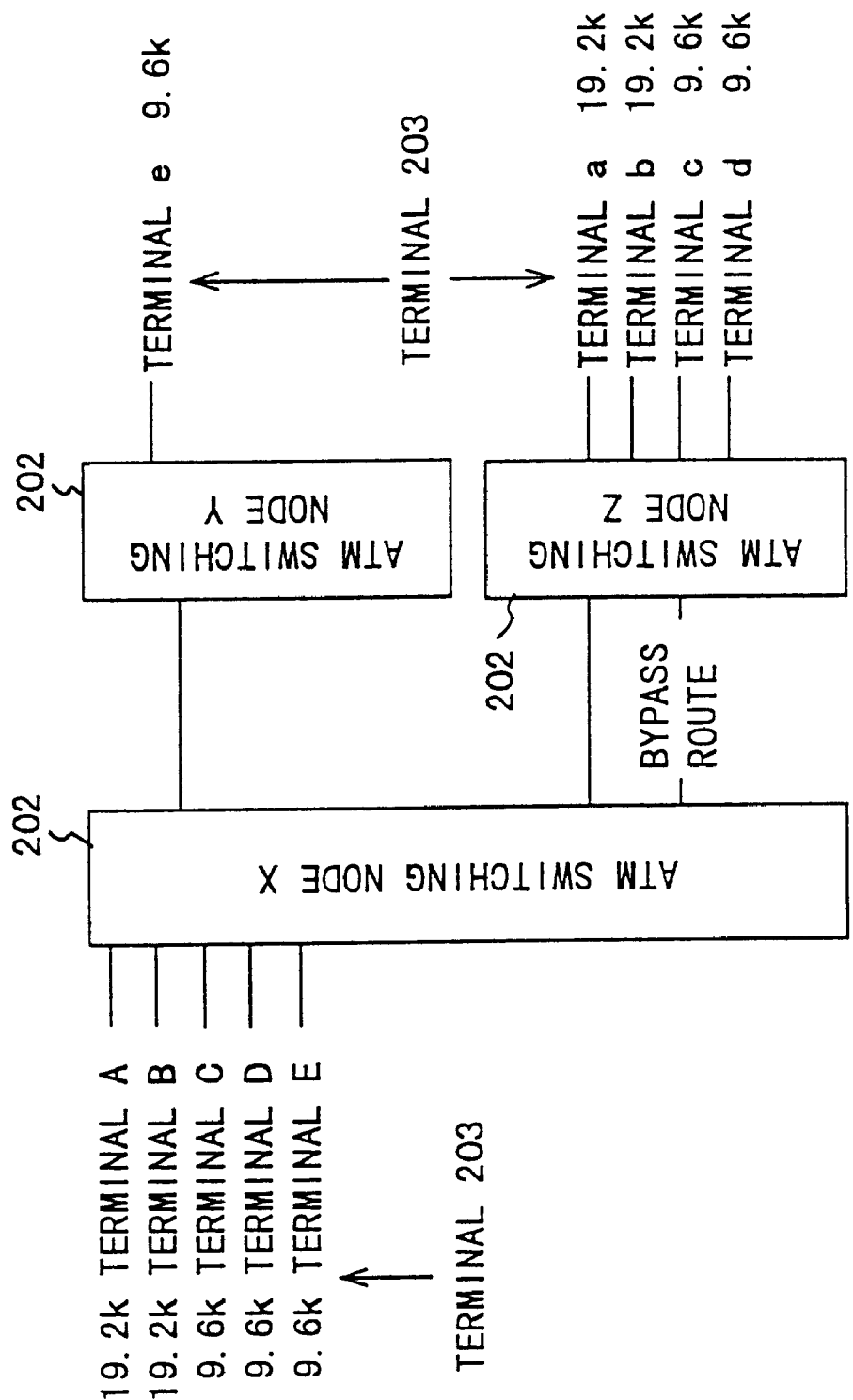
FIG. 13 exemplifies the structure of the ATM network 201 (No. 2)

Suppose that the plurality of terminals 203 in the system configuration shown in FIG. 2 are arranged as shown in FIG. 13 in the following explanation. Also suppose that terminals "A" and "a", "B" and "b", "C" and "C", "D" and "d", and "E" and "e", which are the plurality of terminals 203, communicate with each other in FIG. 13.

Returning to the explanation of FIG. 12, the terminals "A" and "B" are defined in the same manner.

The setting of the terminal C is the same as those of the terminals A and B except for a multiplexing unit field TS and a priority field. The multiplexing unit of the terminal C is set separately from those of the terminals A and B. The priority of the terminal C is assigned to be "medium".

For the terminal D, its multiplexing unit is set separately from those of the terminals A, B, and C; secondary VPI/VCI are set to be "unused" so that the terminal D does not become a bypass target when a bypass operation is performed; and the type of the QoS, which is a service category, is set separately from those of the terminals A, B, and C.

For the terminal E, its route is different from that of the terminals A through D. Therefore, its bypass route is defined to be "none".

Figure 14:
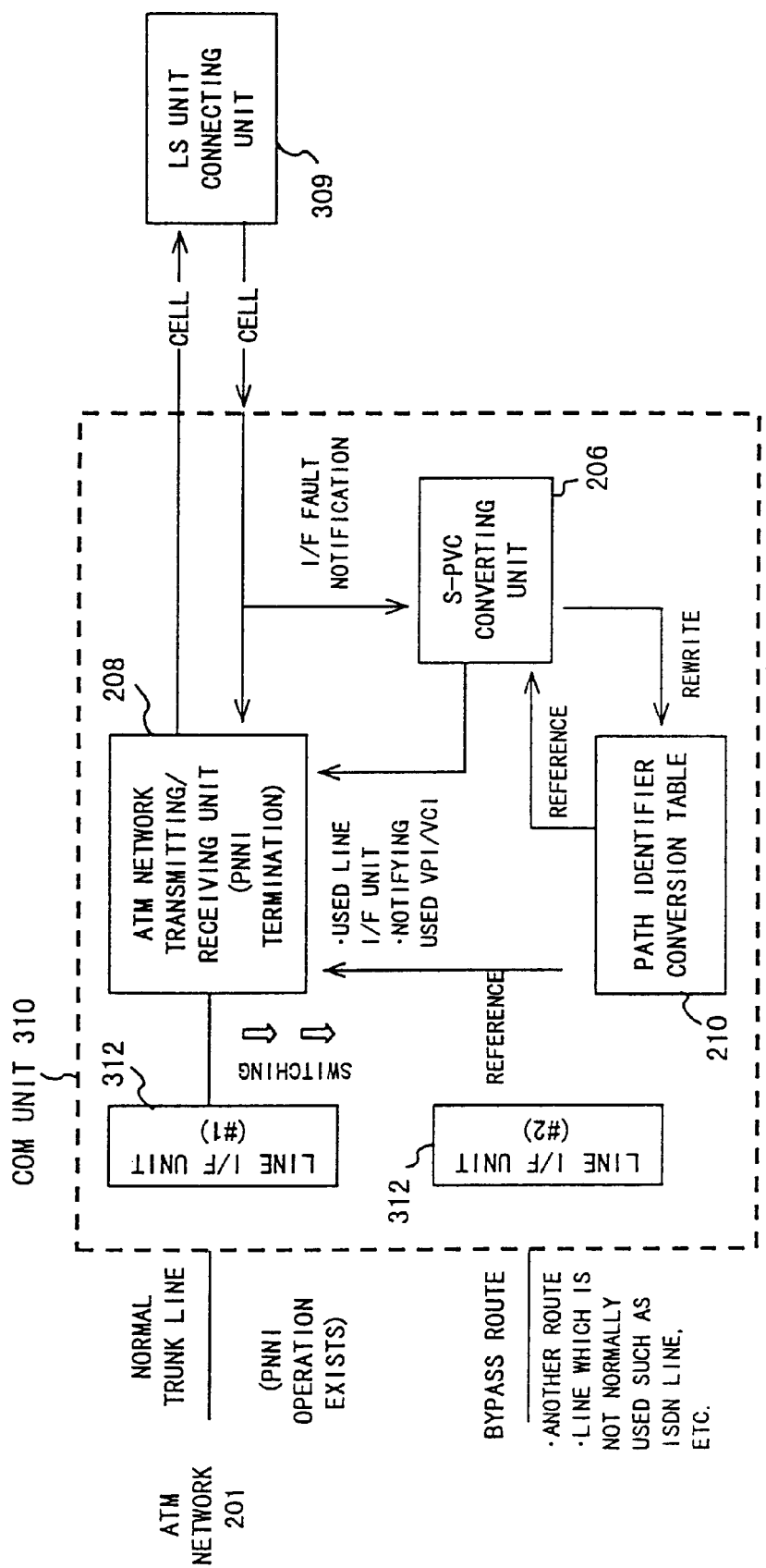
FIG. 14 is a schematic diagram explaining a bypass operation of an ATM trunk line.

Provided below is the explanation about the bypass operation using the path identifier conversion table 210 having the data format shown in FIG. 12. FIG. 14 is a schematic diagram explaining this bypass operation.

In FIG. 14, if a fault occurs on a normal ATM trunk line when the ATM network transmitting/receiving unit 208 makes a data communication by using the ATM trunk line in the ATM network 201 via the line interface unit 312 (#1), the following operational sequence is performed. Consequently, the data communication is resumed and the links between the terminals 203 are restored.

Step 1: the occurrence of the fault on the normal ATM trunk line is notified to the S-PVC converting unit 206.

Step 2: The S-PVC converting unit 206 changes the setting of the state field of the entry corresponding to the ATM trunk line in the path identifier conversion table 210 from "normal" to "abnormal".

Step 3: If a bypass route is set in the entry at this time, the line interface (IF) unit identifier (for example, the identifier corresponding to an ISDN line) and the normal VPI/VCI of the bypass route are extracted, and are notified to the ATM network transmitting/receiving unit 208. If the normal VPI/VCI themselves are in an abnormal state, secondary VPI/VCI are used.

Step 4: The ATM network transmitting/receiving unit 208 establishes a path connection by using the normal VPI/VCI in accordance with the P-NNI protocol for the ATM trunk line of the bypass route, which is accommodated by the notified line interface unit 312 (#2), instead of the ATM trunk line on which the fault occurs. For example, if the secondary VPI/VCI are set, the corresponding S-PVC/PVP is set as this path. If the secondary VPI/VCI are not set, an SVC can be set.

Step 5: After the path between the local ATM switching node 202 and its opposing ATM switching node 202 is established, communications are resumed. As a result, the links between the terminals 203 are re-established.

If a fault occurs on the normal ATM trunk line, only the terminals A, B, C, and D whose bypass route is defined are restored in the example shown in FIGS. 12 and 13. However, the bypass operation of the terminal E is not performed because its bypass route is not defined in the example.

Provided below is the explanation about the priority operation by using the path identifier conversion table 210 having the data format shown in FIG. 12.

In FIG. 14, if a fault occurs on a normal ATM trunk line when the ATM network transmitting/receiving unit 208 makes a data communication by using the ATM trunk line in the ATM network 201 via the line interface unit 312 (#1), the above described operational sequence of steps 1 through 5 is performed.

At this time, the ATM network transmitting/receiving unit 208 performs control in such a way that the switching to a bypass route is performed sequentially from the multiplexing unit (identified by the TS field) which corresponds to an entry whose priority is assigned to be higher in the path identifier conversion table 210.

For example, the ATM network transmitting/ receiving unit 208 performs control in order to add a multiplexing unit whose priority is lower as a bypass target if the bandwidth of a bypass route is empty after bypassing the multiplexing unit whose priority is "high".

In the example shown in FIGS. 12 and 13, the multiplexing unit (TS=03) in which the data of the terminals A and B are multiplexed, is switched to a bypass route if a fault occurs on a normal ATM trunk line. If the bypass route has extra bandwidth, the multiplexing unit (TS=04) in which the data of the terminal C is multiplexed is switched to its bypass route. Furthermore, the multiplexing unit (TS=05) in which the data of the terminal D are multiplexed is switched to its bypass circuit.

Provided next is the explanation about the quality control operation performed by using the path identifier conversion table 210 having the data format shown in FIG. 12.

In FIG. 14, if a fault occurs on a normal ATM trunk line when the ATM network transmitting/receiving unit 208 makes a data communication by using the ATM trunk line in the ATM network 201 via the line interface unit 312 (#1), the above described operational sequence of steps 1 through 5 is performed.

At this time, the ATM network transmitting/receiving unit 208 controls the switching to the bypass route according to the QoS type of each entry in the path identifier conversion table 210.

For example, the ATM network transmitting/receiving unit 208 operates in order to recognize the multiplexing unit whose QoS type is any of the following types as a bypass target.

Only CBR (Constant Bit Rate)

CBR and UBR (Unspecified Bit Rate)

All types except for UBR

If a fault occurs on a normal ATM trunk line in the examples shown in FIGS. 12 and 13, only the multiplexing units corresponding to the terminals A, B, and C which use the CBR service for their bypass routes are switched to these routes.

According to the preferred embodiment of the present invention, the bit accommodation pattern table 209 is rewritten between opposing ATM switching nodes 202, thereby changing the accommodation unit of the terminals 203.

Figure 15:
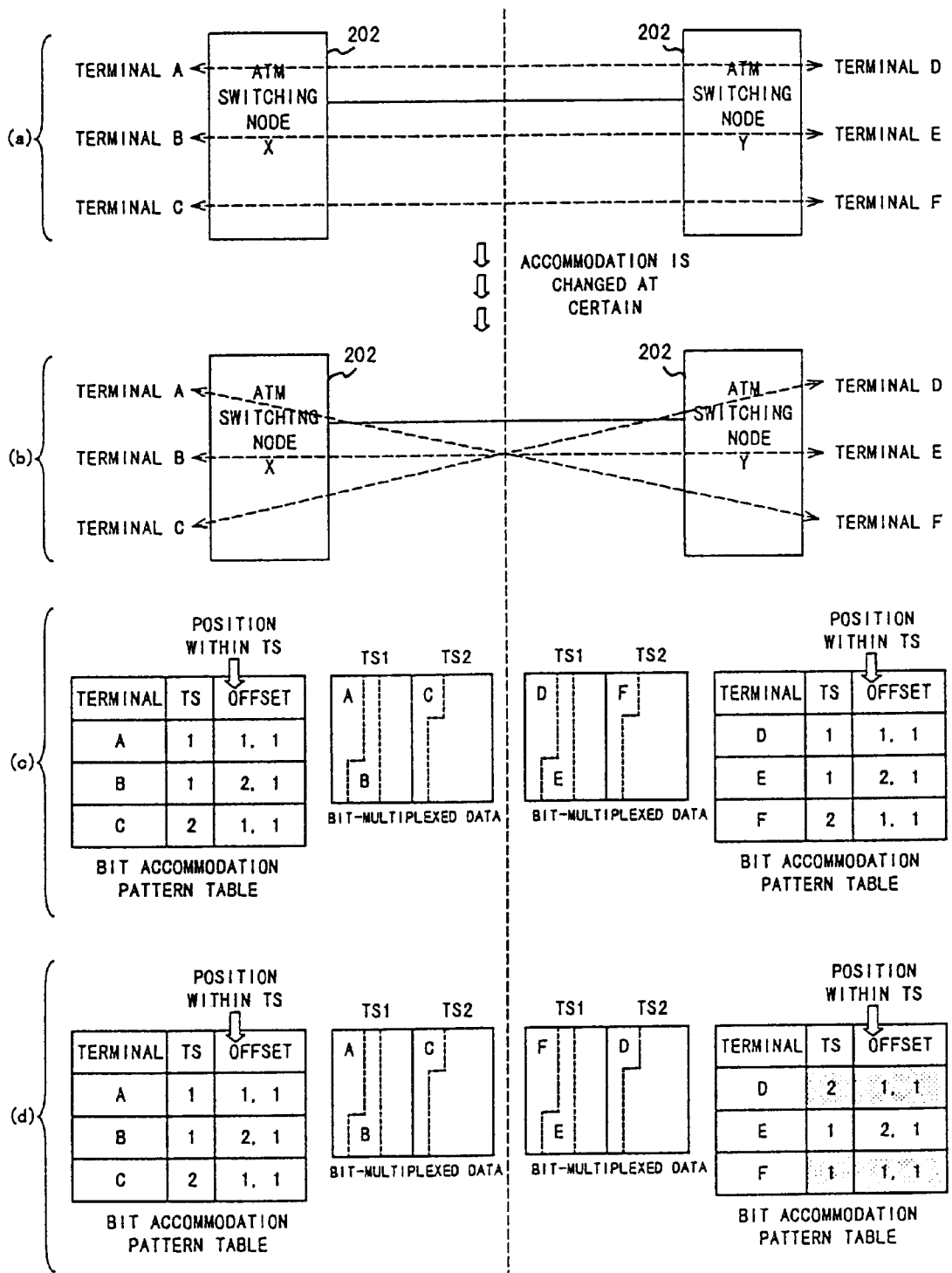
FIGS. 15(a) through 15(d) are schematic diagrams explaining a process for rewriting a bit accommodation pattern table.

Assume that terminals A and D, B and E, and C and F communicate with each other between ATM switching nodes 202 (X) and 202 (Y) as shown in FIG. 15(a). Also assume that the contents of the bit-multiplexed data in the bit accommodation pattern table 209, which correspond to these terminals, are the contents shown in FIG. 15(c).

By exchanging the contents of the entries corresponding to the terminals D and F in the bit accommodation pattern table 209 as shown in the shaded portions of FIG. 15(d), the accommodation units can be instantaneously changed in order to make the terminals A and F, and C and D communicate with each other as shown in FIG. 15(b).

Lastly, according to the preferred embodiment of the present invention, a point-to-multipoint connection can be implemented.

Figure 16:
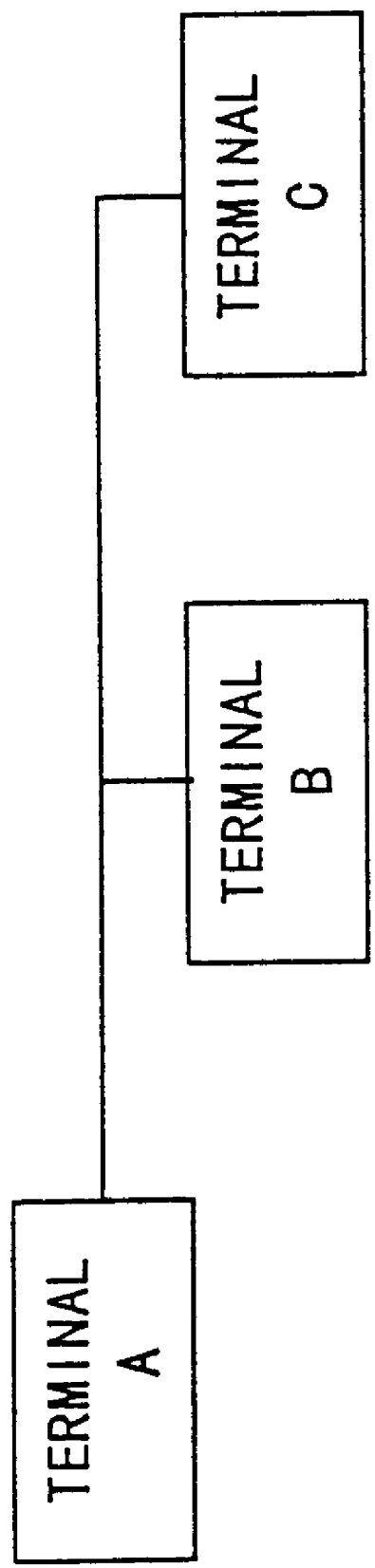
FIG. 16 is a block diagram explaining a point-to-multipoint connection (No. 1)

For example, multi-address calling from the terminal A to the terminals B and C is implemented as shown in FIG. 16.

Note that, however, the point-to-multipoint connection is implemented only for the terminal 203 which can perform the following terminal operations.

The terminals B and C check a destination according to a protocol of an upper layer, and can capture only the reception data addressed to their own terminals.

The reply data to the terminal A is returned only for the data addressed to its own terminal.

Figure 17:
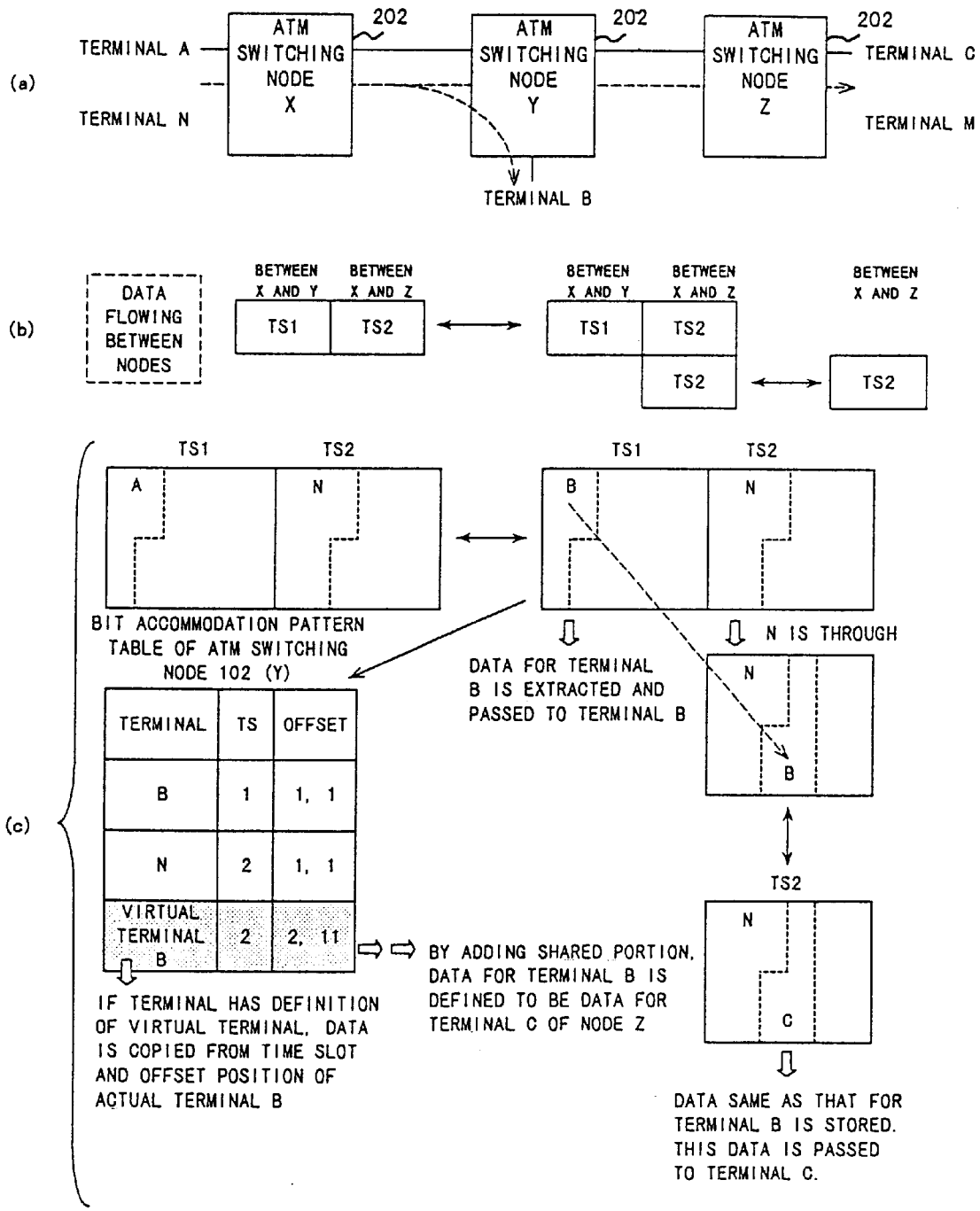
FIGS. 17(a) through 17(c) are schematic diagrams explaining a point-to-multipoint connection (No. 2).

Here, as shown in FIG. 17A, assume that a point-to-multipoint connection is made from the terminal A of the ATM switching node 202 (X) to the terminal B of the ATM switching node 202 (Y) and the terminal C of the ATM switching node 202 (Z), and that a normal point-to-point connection is made between the terminal N of the ATM switching node 202 (X) and the terminal M of the ATM switching node 202 (Z).

In this case, the data of the terminal N, which is to be bit-multiplexed for the time slot TS2, is transferred from the ATM switching node 202 (X) to the ATM switching node 202 (Z) via the ATM switching node 202 (Y), and terminates at the terminal M.

To the bit accommodation pattern table 209 in the ATM switching node 202 (Y), the entry "a virtual terminal B" is registered as shown in FIG. 17(c). To the TS and offset fields of this entry, the information about the bit accommodation pattern of the data of the terminal C of the ATM switching node 202 (Z) are registered.

In this state, the data of the terminal A to be bit-multiplexed for the time slot TS1 is transferred from the ATM switching node 202 (X) to the ATM switching node 202 (Y), passed to the terminal B, and copied to the bit multiplexing position of the terminal C in the time slot TS2 leading to the ATM switching node 202 (Z).

As a result, the data of the terminal A is again bit-multiplexed for the time slot TS2, and is further transferred from the ATM switching node 202 (Y) to the ATM switching node 202 (Z), and terminates at the terminal C.

In this way, the point-to-multipoint connection is implemented.

Furthermore, by applying this control and registering the entry for a backup terminal to the bit accommodation pattern table 209 as a virtual terminal, it also becomes possible to bypass the data of a terminal 203 to another terminal 203 or another ATM switching node 202 when a fault occurs on a line of the terminal 203.

What is claimed is:

1. A cell transmitting device for accommodating a terminal and multiplexing cells on a trunk line in a cell transmitting network for logically multiplexing fixed-length cells and making a communication, comprising:

a bit accommodation pattern table for storing control information for providing bit accommodation patterns as to how data from a plurality of terminals are accommodated into the predetermined multiplexing unit data in bits;

a bit multiplexing/demultiplexing device references said bit accommodation pattern table for controlling a multiplexing/demultiplexing process, multiplexes the data from each of the plurality of terminals into the predetermined multiplexing unit data and demultiplexes the data which is multiplexed into the predetermined multiplexing unit data and is addressed to each of the plurality of terminals, and transmitting the demultiplexed data to each of the plurality of terminals; and a cell conversion processing device for performing inter-conversion between the predetermined multiplexing unit data to be processed by said bit multiplexing/demultiplexing device and cells corresponding to a predetermined link.

2. The cell transmitting device according to claim 1, wherein:

said bit multiplexing/demultiplexing device multiplexes/demultiplexes data corresponding to a terminal belonging to a group into/from individual multiplexing unit data corresponding to the group for each of a plurality of terminals, the cell transmitting device further comprising:

a communication controlling device for performing different communication control for each of the plurality of terminal groups.

3. The cell transmitting device according to claim 2, wherein:

said communication controlling device performs bypass control of an individual trunk line for each of the plurality of terminal groups when a communication fault occurs.

4. The cell transmitting device according to claim 3, wherein:

said communication controlling device performs bypass control of a trunk line based on an individual priority for each of the plurality of terminal groups when a communication fault occurs.

5. The cell transmitting device according to claim 3, wherein:

said communication controlling device performs bypass control of a trunk line based on an individual service category for each of the plurality of terminal groups when a communication fault occurs.

6. The cell transmitting device according to claim 1, wherein:

said cell converting device switches the predetermined link corresponding to cells to be converted/restored into/from the predetermined multiplexing unit data to a predetermined secondary link, when a communication fault occurs.

7. The cell transmitting device according to claim 1, wherein:

said cell converting device switches the link corresponding to cells to be converted/restored into/from the predetermined multiplexing unit data to another link established by a call set-up.

8. The cell transmitting device according to claim 1, further comprising:

a table rewrite controlling device for changing a connection configuration of the terminal by rewriting said bit accommodation pattern table according to a predetermined condition.

9. The cell transmitting device according to claim 8, wherein:

said table rewrite controlling device rewrites said bit accommodation pattern table according to a time zone, a day of a week, or a date.

10. The cell transmitting device according to claim 1, wherein:

a point-to-multipoint connection control or a control, where data corresponding to a predetermined terminal is bypassed to another terminal or another cell transmitting device when a fault occurs in the terminal or on a line of the terminal, is made by setting an entry for specifying that data input from a trunk line side is transmitted to an identical or a different trunk line sides as it is in said bit accommodation pattern table.

11. The cell transmitting device according to claim 1, wherein:

the cells are asynchronous transfer mode cells.

12. A cell transmitting method for accommodating a terminal and multiplexing cells on a trunk line in a cell transmitting network for logically multiplexing fixed-length cells and making a communication, comprising the steps of:

storing information for providing bit accommodation patterns in a bit accommodation pattern table as to how data from a plurality of terminals are accommodated into predetermined multiplexing unit data in bits;

multiplexing the data from each of the plurality of terminals into the predetermined multiplexing unit data by referencing the bit accommodation pattern table thereby controlling the multiplexing process according to the bit accommodation patterns;

demultiplexing the data which is multiplexed into the predetermined multiplexing unit data and is addressed to each of the plurality of terminals, and transmitting the demultiplexed data to each of the plurality of terminals by referencing the bit accommodation pattern table thereby controlling the demultiplexing process according to the bit accommodation patterns; and performing interconversion between the predetermined multiplexing unit data and cells corresponding to a predetermined link.

13. The cell transmitting method according to claim 12, wherein:

data corresponding to a terminal belonging to a group is multiplexed/demultiplexed into/from individual multiplexing unit data corresponding to the group for each of a plurality of terminals; and different communication control is performed for each of the plurality of terminal groups.

14. The cell transmitting method according to claim 13, further comprising the step of:

performing bypass control of an individual trunk line for each of the plurality of terminal groups, when a communication fault occurs.

15. The cell transmitting method according to claim 14, further comprising the step of:

performing bypass control of a trunk line based on an individual priority for each of the plurality of terminal groups, when a communication fault occurs.

16. The cell transmitting method according to claim 14, further comprising the step of:

performing bypass control of a trunk line based on an individual service category for each of the plurality of terminal groups, when a communication fault occurs.

17. The cell transmitting method according to claim 12, further comprising the step of:

switching the predetermined link corresponding to cells to be converted/restored into/from the predetermined multiplexing unit data to a predetermined secondary link, when a communication fault occurs.

18. The cell transmitting method according to claim 12, further comprising the step of:

switching the link corresponding to cells to be converted/restored into/from the predetermined multiplexing unit data to another link established by a call set-up.

19. The cell transmitting method according to claim 12, further comprising the step of:

changing a connection configuration of the terminal by rewriting the bit accommodation pattern table according to a predetermined condition.

20. The cell transmitting method according to claim 19, wherein:

rewriting the bit accommodation pattern table according to a time zone, a day of a week, or a date.

21. The cell transmitting method according to claim 12, further comprising the step of:

making a point-to-multipoint connection control or performing a control, where data corresponding to a predetermined terminal is bypassed to another terminal or another cell transmitting device when a fault occurs in the terminal or on a line of the terminal, by setting an entry for specifying that data input from a trunk line side is transmitted to an identical or a different trunk line side as it is in the bit accommodation pattern table.

22. The cell transmitting method according to claim 12, wherein:

the cells are asynchronous transfer mode cells.

\* \* \* \* \*